United States Patent [19]

Penzhorn et al.

[11] Patent Number: 4,774,065

[45] Date of Patent: Sep. 27, 1988

[54] PROCESS AND APPARATUS FOR DECONTAMINATING EXHAUST GAS FROM A FUSION REACTOR FUEL CYCLE OF EXHAUST GAS COMPONENTS CONTAINING CHEMICALLY BONDED TRITIUM AND/OR DEUTERIUM

[75] Inventors: Ralf-Dieter Penzhorn, Bruchsal; Manfred Glugla, Karlsruhe, both of Fed. Rep. of Germany

[73] Assignee: Kernforschungzentrum Karlsruhe GmbH, Karlsruhe, Fed. Rep. of Germany

[21] Appl. No.: 19,985

[22] Filed: Feb. 27, 1987

[30] Foreign Application Priority Data

Feb. 27, 1986 [DE] Fed. Rep. of Germany ....... 3606316

[51] Int. Cl.⁴ .................. B01D 53/36; G21B 1/00
[52] U.S. Cl. .................. 423/210; 376/146; 376/310; 376/325; 423/219; 423/237; 423/245; 423/247; 423/248; 423/262; 423/657
[58] Field of Search ........... 423/210, 219, 237, 245 S, 423/247, 248, 262, 351, 648 A, 648 R, 657, 658; 376/100, 146, 463, 401, 310, 325

[56] References Cited

U.S. PATENT DOCUMENTS

| | | | |
|---|---|---|---|
| 2,533,138 | 12/1950 | Newton | 423/219 |
| 3,061,403 | 10/1962 | Rendos | 423/262 |
| 3,198,604 | 8/1965 | Pfefferle | 423/648 R |
| 3,870,622 | 3/1975 | Ashton et al. | 208/93 |
| 3,926,782 | 12/1975 | Plank | 208/135 |
| 4,058,449 | 11/1977 | Reitz et al. | 208/59 |
| 4,173,620 | 11/1979 | Shimizu | 423/249 |
| 4,178,350 | 12/1979 | Collins et al. | 423/248 |
| 4,276,060 | 6/1981 | Aldridge | 55/67 |
| 4,282,084 | 8/1981 | Gross et al. | 208/113 |
| 4,313,911 | 2/1982 | Moran et al. | 422/159 |
| 4,350,614 | 9/1982 | Schwartz | 208/120 |
| 4,487,670 | 12/1984 | Bellanger et al. | 204/129 |
| 4,522,894 | 6/1985 | Hwang et al. | 429/17 |

FOREIGN PATENT DOCUMENTS

1238884 4/1967 Fed. Rep. of Germany ... 423/648 R

OTHER PUBLICATIONS

Kerr et al, *Proc. Tritium Technology in Fission, Fusion & Isotopic Application*, "Fuel Cleanup System for the Tritium Systems Test Assembly: Design & Experiments", Dayton, Ohio, Apr. 29, 1980, pp. 115–118.

*Primary Examiner*—John Doll
*Assistant Examiner*—Jeffrey Edwin Russel
*Attorney, Agent, or Firm*—Sughrue, Mion, Zinn, Macpeak, and Seas

[57] ABSTRACT

Process for decontaminating an exhaust gas from a fusion reactor fuel cycle of exhaust gas components containing at least one heavy hydrogen isotope selected from tritium and deuterium in compound form, the compound form being ammonia and hydrocarbon, the exhaust gas containing CO and hydrogen isotopes and in which the at least one heavy hydrogen isotope is liberated from its compound, separated out from the exhaust gas and fed back into the fuel cycle, comprising (a) carrying out a catalytic oxidation reaction at a temperature of from 200° C. to 250° C., to oxidize the exhaust gas components, without changing the ammonia, as follows: CO to $CO_2$, hydrocarbon to $CO_2$+water, and the hydrogen isotopes to water, (b) bringing the gas admixture resulting from step (a) into contact with a metal bed at a temperature in the range of 200° C. to 400° C. to selectively transform the water into hydrogen isotopes and to remove $O_2$, (c) bringing the gas admixture resulting from step (b) ino contact with a hot membrane made of palladium or a palladium-silver alloy to crack the ammonia at a temperature of 400° C. to 450° C., and to pass all liberated hydrogen isotopes through the membrane to separate out the liberated hydrogen isotopes from the flow of the remaining exhaust gas, and (d) discharging the remaining decontaminated exhaust gas into the surrounding air.

2 Claims, 1 Drawing Sheet

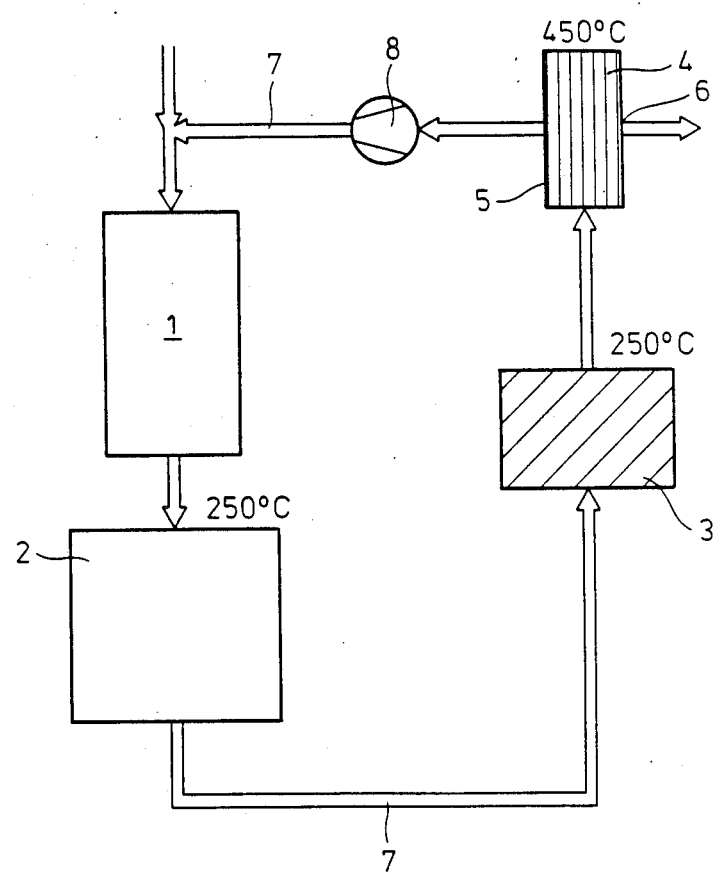

PROCESS AND APPARATUS FOR DECONTAMINATING EXHAUST GAS FROM A FUSION REACTOR FUEL CYCLE OF EXHAUST GAS COMPONENTS CONTAINING CHEMICALLY BONDED TRITIUM AND/OR DEUTERIUM

BACKGROUND OF THE INVENTION

The present invention relates to a process and an apparatus for decontaminating exhaust gas from a fusion reactor fuel cycle of exhaust gas components containing chemically bonded tritium and/or deuterium, in which the tritium and/or deuterium is/are liberated from its/their compounds, separated out from the exhaust gas and fed back into the fuel cycle.

The exhaust gas from the fuel cycle of a fusion reactor contains about 85%-by-volume noble gases and about 15%-by-volume impurities, including small residual amounts of heavy hydrogen. The impurities accumulate in the form of argon, "tritiated" and/or "deuterated" hydrocarbons, particularly tritiated and/or deuterated $CH_4$, tritiated and/or deuterated water and tritiated and/or deuterated ammonia. The exhaust gas must thus be liberated both from free tritium as well as impurities containing tritium and be contaminated to a value level permissible for emission before the exhaust gas remainder can be released into the surrounding atmosphere. Moreover, it is desirable to recover the tritium and deuterium from their compounds and to feed the tritium and deuterium back into the fuel cycle, not least because it is in this way guaranteed that the tritium is kept from entering the surrounding atmosphere.

A process and an apparatus for decontaminating exhaust gas of tritium and/or deuterium has been suggested by Kerr et al, "Fuel Cleanup System for the Tritium Systems Test Assembly: Design and Experiments", *Proceedings of Tritium Technology in Fission, Fusion and Isotopic Application,* Dayton, Ohio, Apr. 29, 1980, at pages 115 to 118. According to one process described by Kerr et al, the exhaust gas containing the impurities is first passed through an intermediate container, that is, a variable volume surge tank which is used to remove flow fluctuations and provide a constant feed pressure. The exhaust gas is then passed to a first catalytic reactor in which any free oxygen is reduced and combined with hydrogen at 450° K. to form water. The exhaust gas is then sent to a molecular sieve bed at 75° K. in which all impurities are adsorptively removed and are thus separated out from the exhaust gas. When the capacity of the molecular sieve bed is exhausted, it is heated to 400° K. to desorb the impurities which are then sent to a second catalytic reactor in the form of an oxygen-supplying packed bed operating at 800° K. where the impurities (e.g., ammonia and hydrocarbons) are oxidized into tritium- and/or deuterium-containing water and into tritium- and/or deuterium-free compounds, namely into $CO_2$, $N_2$ and Ar. The tritium- and/or deuterium-containing water then is frozen out at 160° K., and thereafter the frozen water is periodically vaporized. The vapors are fed into a hot uranium metal bed which acts as a getter and which at 750° K. transforms (reduces) the water into D- and/or T-containing hydrogen and stable $UO_2$. In lieu of the reduction by means of the uranium metal bed, Kerr et al state that the reduction can also be carried out with the aid of an electrolytic cell when such a cell becomes available.

Kerr et al also describe a process based on hot uranium metal getters. In this process, the exhaust gas, after leaving the variable volume surge tank, enters a primary uranium bed operating at 1170° K. In this bed, impurities are removed by chemical reactions that form uranium oxides, carbides, and nitrides. The inert argon, with traces of the other impurities, passes through the primary uranium bed and is sent to a molecular sieve bed as in the above-described process. The regenerated argon, with a small amount of tritium, is sent from the molecular sieve bed to a titanium bed, at 500° K., which collects DT and passes on an argon stream containing only tenths of a ppm of DT. Kerr et al state that a disadvantage of this process is that operating temperatures of 1170° K. cause permeation and material problems.

Kerr et al also describe the use of palladium diffusers, and state that they have numerous disadvantages including the need for elevated pressures, reported brittle failures during temperature cycling, reported poisoning by ammonia and methane, and the fact that they can not produce an impurity stream free of hydrogen isotopes.

The processes suggested heretofore for decontaminating exhaust gases of tritium and/or deuterium have the following disadvantages: many steps in the process; high temperature and thus the danger of tritium losses through permeation; operation of the oxygen-supplying packed bed (second catalytic reactor) at high temperatures, with which is associated a possible sintering of the packed bed particles as well as an excess of oxygen given off (deactivation), which strains the hot metal getter; transformation of ammonia and hydrocarbons by oxidation at the second catalytic reactor with formation of water and subsequent reduction of the water created by the hot metal getter (strain on the hot metal getter); oxidation of hydrogen to water at the first catalytic reactor and subsequent reduction of the water created by the hot metal getter (strain of the hot metal getter); high radioactive waste solids and creation of nitrogen oxides during $NH_3$ oxidation on the oxygen-supplying packed solids bed (second catalytic reactor).

SUMMARY OF THE INVENTION

An object of the present invention is to provide a process and an apparatus for decontaminating the exhaust gas from a fusion reactor fuel cycle of exhaust components which contain tritium and/or deuterium in chemically bonded form.

A further object of the present invention is to provide such a process in which tritium and/or deuterium losses through permeation and the high stresses of the hot metal getter materials, as they appeared in the heretofore known, prior art processes, as well as the formation of nitrogen oxides are avoided.

Another object of the present invention is to provide such a process which is energy-saving vis-a-vis the heretofore known processes and which is able to be implemented simply.

A still further object of the present invention is to provide such a process which is able to feed back the liberated tritium and/or deuterium into the fuel cycle without further treatment steps, with the exception of an isotope separation.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for decontaminating an exhaust gas from a fusion reactor fuel cycle of exhaust gas components containing at least one heavy hydrogen isotope selected from tritium and deuterium in compound form, the compound form being ammonia and hydrocarbon, the exhaust gas containing CO and hydrogen isotopes, and in which the at least one heavy hydrogen isotope is liberated from its compound, separated out from the exhaust gas and fed back into the fuel cycle, comprising (a) carrying out a catalytic oxidation reaction at a temperature of from 200° C. to 250° C., to oxidize the exhaust gas components, without changing the ammonia, as follows: CO to $CO_2$, hydrocarbon to $CO_2$+water, and the hydrogen isotope to water, (b) bringing the gas admixture resulting from step (a) into contact with a metal bed at a temperature in the range of 200° C. to 400° C. to selectively transform the water into hydrogen isotopes and to remove $O_2$, (c) bringing the gas admixture resulting from step (b) into contact with a hot membrane made of palladium or a palladium-silver alloy to crack the ammonia at a temperature of 400° C. to 450° C., and to pass all liberated hydrogen isotopes through the membrane to separate the liberated hydrogen isotope from the flow of the remaining exhaust gas, and (d) discharging the remaining decontaminated exhaust gas into the surrounding air.

The apparatus according to the present invention for implementing the process, comprises an exhaust gas conduit which is channeled into the cycle, and arranged in succession in the conduit in the direction of flow of the exhaust gas, there is (a) a buffer vessel for equalizing gas pressure, (b) a heatable catalyst bed for oxidizing CO, hydrocarbon and hydrogen, (c) a heatable metal bed for selectively removing $O_2$ and water from the exhaust gas by chemical reaction, and (d) a container holding at least one heatable membrane, the container having a product discharge valve for the hydrogen isotopes. Preferably at least one pump is provided to circulate the exhaust gas.

BRIEF DESCRIPTION OF THE DRAWING

The sole drawing FIGURE shows one embodiment of an apparatus according to the present invention for performing the process according to the present invention.

DETAILED DESCRIPTION OF THE INVENTION

The exhaust gas from the fuel cycle of a fusion reactor has more or less the following composition:

80 to 85 Mol % He, Ar 15 to 20 Mol % $NQ_3$, $CQ_4Q_2O$, $Q_2$, CO, $CO_2$, $N_2$ and $O_2$. (Q=H, D, T)

It is quite obvious that a portion of the heavy hydrogen isotopes can be supplanted by light hydrogen (protium) in the appropriate bondings.

The advantages of the process according to the present invention and the device according to the present invention are to be seen in the fact that (a) a reduction in the number of treatment steps is achieved, (b) with the exception of the cracking temperature for $NQ_3$, the maximal operating temperature within the cycle system does not exceed 400° C. and therefore no losses of tritium can take place by permeation through metallic walls, (c) minimization of radioactive waste solids is attained, (d) a reduction of the strain on the oxygen getter (of the metal bed) to a minimum takes place (in the present invention there is no in-situ $O_2$ formation as a result of thermal decomposition of the oxygen supplying bed) and (e) no nitrogen oxide formation takes place.

In the prior art process which was discussed above, permeation losses of heavy hydrogen can occur both in the catalyst oxidation of the oxidizable exhaust gas components as well as in the reduction of water to hydrogen in the uranium bed.

In the process according to the present invention, the exhaust gas is introduced as feed gas into a pipeline channeled into the cycle, flows through a buffer vessel and then, at 200° to 250° C., passes through a packed bed functioning as a catalyst. The packed bed contains, for example, hopcalite ($CuO/MnO_2$) or perowskite. From this, oxygen and carbon monoxide contained in the exhaust gas are converted to $CO_2$, hydrocarbons, such as methane, are converted to $CO_2$ and water, and hydrogen is oxidized into water; but ammonia in the exhaust gas is not converted and remains in the exhaust gas to be carried further on.

The exhaust gas leaving this catalyst is subsequently passed over a bed, which, for example, can contain uranium metal or titanium metal, at a temperature between 200° and 400° C., preferably at 350° C., in which water is cracked thereby forming hydrogen and, for example, uranium oxide; and oxygen, including any oxygen which possibly was not transformed into carbon dioxide, is gettered.

The exhaust gas leaving this oxygen getter is then conducted through a container which contains one or more membranes made of palladium or of a palladium-silver alloy at a temperature between about 300° and about 450° C., preferably at 400° to 450° C., and at the membranes the ammonia contained in the exhaust gas is quantitatively cracked. The membranes can be designed as a directly heated pipe or pipe assembly, which is jacketed around with a cooled external vessel or container. The membranes are selectively permeable to hydrogen isotopes and from this membrane container, the heavy hydrogen which emerged from the cracking process is drawn off and (if necessary, after passing a hydrogen isotope separating apparatus) is fed back into the fuel cycle of the fusion reactor.

According to its degree of purity, the remaining gas can either be discharged directly into the surrounding air or be run through the cycle until it reaches the required purity, whereby it flows first through the buffer vessel again and then the catalyzer beds, oxygen getter and containers, as described.

While the known process according to the prior art contains at least 7 steps whose individual operational temperatures are far removed from one another (the greatest temperature difference between any two successive and consecutive steps amounts to 640° C. in the embodiment of the Kerr et al process which employs a catalytic reactor to oxidize all oxidizable components of the exhaust gas) the process according to the present invention is designed so that the three steps show significantly smaller temperature differentials on a path in which the temperature rises exclusively. Whereas in the process belonging to the state of the art the catalytic oxidation of all oxidizable components of the exhaust gas takes place at 800° K. (527° C.), in the process according to the present invention the catalytic oxidation for CO, methane and hydrogen is applied at lower temperatures in the area of 200° to 250° C. In the process according to the present invention, the subsequent reduction of water and the removal of oxygen by means of a getter metal at moderate temperatures, for example, at 200° to 400° C. then makes possible the cracking step for ammonia.

Referring now to the drawing, after the exhaust gas which is to be decontaminated is introduced into conduit 7 which is channeled in the cycle, it flows through a buffer vessel 1 and then makes its way into the oxidation catalyst bed 2 in which, at a temperature of $\leq 250°$ C., for example, CO is catalytically oxidized to $CO_2$, the hydrocarbons (methane, for example) into $CO_2$ and water, and the hydrogen isotopes into water. Hopcalite or perowskite can be used as a catalyst. The exhaust gas leaving this bed, still containing ammonia, water and possibly even a residual amount of oxygen, is conducted into a uranium bed 3 heated to 350° C., for example, in which the residual oxygen is gettered and the water selectively cracked, during which time hydrogen isotopes become free and the uranium metal takes up and bonds the water's oxygen. The exhaust gas from the uranium bed 3, which, besides the carrier gas helium, contains practically only ammonia and hydrogen isotopes, is subsequently conducted into a container 5 with, for example, palladium membranes 4 which have been heated to, for example, 450° C. The container 5 is meanwhile cooled at its exterior to $\leq 200°$ C. At the membranes 4, the ammonia is cracked into its elements. At the same time, the hydrogen isotopes penetrate through the membranes and are drawn out of the cycle by way of the discharge valve 6. A pump 8 circulates the exhaust gas through the conduit.

It will be understood that the above description of the present invention is susceptible to various modifications, changes and adaptations, and the same are intended to be comprehended within the meaning and range of equivalents of the appended claims.

What is claimed is:

1. Process for decontaminating an exhaust gas from a fusion reactor fuel cycle of exhaust gas components containing at least one heavy hydrogen isotope selected from tritium and deuterium in compound form, the compound form being ammonia and hydrocarbon, the exhaust gas containing CO and hydrogen isotopes and in which the at least one heavy hydrogen isotope is liberated from its compound, separated out from the exhaust gas and fed back into the fuel cycle, comprising
    (a) carrying out a catalytic oxidation reaction at a temperature of from 200° C. to 250° C., to oxidize the exhaust gas components, without changing the ammonia, as follows: CO to $CO_2$, hydrocarbon to $CO_2$+water, and the hydrogen isotopes to water,
    (b) bringing the gas admixture resulting from step (a) into contact with a metal bed at a temperature in the range of 200° C. to 400° C. to selectively transform the water into hydrogen isotopes and to remove $O_2$,
    (c) bringing the gas admixture resulting from step (b) into contact with a hot membrane made of palladium or a palladium-silver alloy to crack the ammonia at a temperature of 400° C. to 450° C., and to pass all liberated hydrogen isotopes through the membrane to separate out the liberated hydrogen isotopes from the flow of the remaining exhaust gas, and
    (d) discharging the remaining decontaminated exhaust gas into the surrounding air.

2. Process according to claim 1, wherein the hydrocarbon is essentially methane together with ethane and higher aliphatic and cyclic hydrocarbons.

* * * * *